United States Patent
Engholm et al.

(10) Patent No.: US 6,782,256 B2
(45) Date of Patent: Aug. 24, 2004

(54) MEASURING WIRELESS NETWORK PERFORMANCE VIA A WORLD WIDE NETWORK

(75) Inventors: Kathryn A. Engholm, Beaverton, OR (US); Paul J. Stadnik, Lake Oswego, OR (US); John F. Turpin, Tigard, OR (US)

(73) Assignee: Tektronix, Inc., Beaverton, OR (US)

( * ) Notice: Subject to any disclaimer, the term of this patent is extended or adjusted under 35 U.S.C. 154(b) by 480 days.

(21) Appl. No.: 09/815,070

(22) Filed: Mar. 22, 2001

(65) Prior Publication Data

US 2002/0137504 A1 Sep. 26, 2002

(51) Int. Cl.⁷ .............................................. H04Q 7/20
(52) U.S. Cl. ....................................................... 455/423
(58) Field of Search ................................ 455/423, 424, 455/425

(56) References Cited

U.S. PATENT DOCUMENTS

2002/0137504 A1 * 9/2002 Engholm et al. ........... 455/423

* cited by examiner

Primary Examiner—William Cumming
(74) Attorney, Agent, or Firm—Francis I. Gray

(57) ABSTRACT

Measuring wireless network performance from a remote site uses a mobile handset that may include an appropriate world wide network browser. A user connects the mobile handset to the remote site via the wireless network which is coupled to the world wide network. Once the connection is made, application software at the measurement site sends commands to the mobile handset and in response the mobile handset sends measurement data to the application software. The application software processes the data to provide information about the wireless network performance including analyses for predictive and diagnostic purposes, since measurement data from many handsets, many locations and many base stations at many times may be collected at one central location.

5 Claims, 1 Drawing Sheet

MEASURING WIRELESS NETWORK PERFORMANCE VIA A WORLD WIDE NETWORK

BACKGROUND OF THE INVENTION

The present invention relates to test and measurement of wireless networks, and more particular to measuring wireless network performance via a world wide network such as the Internet.

With the proliferation of wireless communications wireless operators need to assure that their customers are able to receive quality communications via their mobile handsets virtually anywhere over a large geographic area and even the entire world. It therefore is necessary that the wireless operators know the strengths and limitations of their networks in a complex environment in order to assure that their customers receive uninterrupted and clear service wherever they might be. This requires extensive performance measurements of the wireless network performance over the geographic area that the wireless operator services.

In the wireless environment, such as those defined by the WCDMA, CDMA2000 and IS-95 signal standards as well as others, technical specifications delineate what measurements mobile handsets are to make to determine the condition of the wireless network. Such measurements generally include a pass/fail status and a few key parameters. The data derived from the measurements may be stored and subsequently analyzed for predictive and diagnostic purposes. One current means for acquiring the measurement data includes test equipment and/or network-specific software for connecting into and communicating with the operating equipment of the wireless network. The operating equipment collects measurement results from base stations and mobile handsets in the wireless link and returns the data to the test equipment/software. Another means is to have the mobile handset connected to a local personal computer (PC) via RS232 or a similar protocol. Software runs on the local PC to control the mobile handset and collect measurement results—Drive Test systems are an example of this type. Yet another means involves dialing a specific set of numbers with the mobile handset, which numbers cause the network operating equipment to perform a series of actions. The user listens to the mobile handset and watches its display during these actions to determine from the sounds and displayed information whether the actions are producing the expected results. This requires that the network be equipped with the appropriate test software to perform the actions in response to the set of numbers. In all these cases the test results are processed locally by the test equipment/software, by the local PC or by the user's eyes and ears.

What is desired is a means for measuring wireless network performance independent of brand/model of operating equipment by executing a simple procedure with a stand-alone mobile handset while being able to analyze the received data for predictive and diagnostic purposes at a central location.

BRIEF SUMMARY OF THE INVENTION

Accordingly the present invention provides means for measuring wireless network performance from a remote site, such as an Internet website, using mobile handsets which also may have browsers. A wireless network including a switch, controller, base station and mobile handsets is coupled to the remote measurement site via a world wide network by dialling up a network service provider, such as an Internet Service Provider (ISP) for the Internet, via a Public Switched Telephony Network (PSTN) using the wireless handsets over the wireless network. Then the browser may be used to complete the connection to the remote site over the world wide network. A measurement computer at the remote measurement site has application software that sends commands to the mobile handset via the world wide and wireless networks, and in response receives measurement data from which the wireless network performance is determined. Alternatively the mobile handset may be connected to a wireless service provider's site on the world wide network and the measurement data may be collected at the wireless service provider's site. The data is then transferred over the world wide network to the measurement computer at the remote site for processing to determine wireless network performance. The measurement computer, having all the measurement data centrally located from many handsets at many locations from many times, may perform predictive and diagnostic analyses for the wireless network as well.

The objects, advantages and other novel features of the present invention are apparent from the following detailed description when read in conjunction with the appended claims and attached drawing.

DETAILED DESCRIPTION OF THE INVENTION

Figure 1:
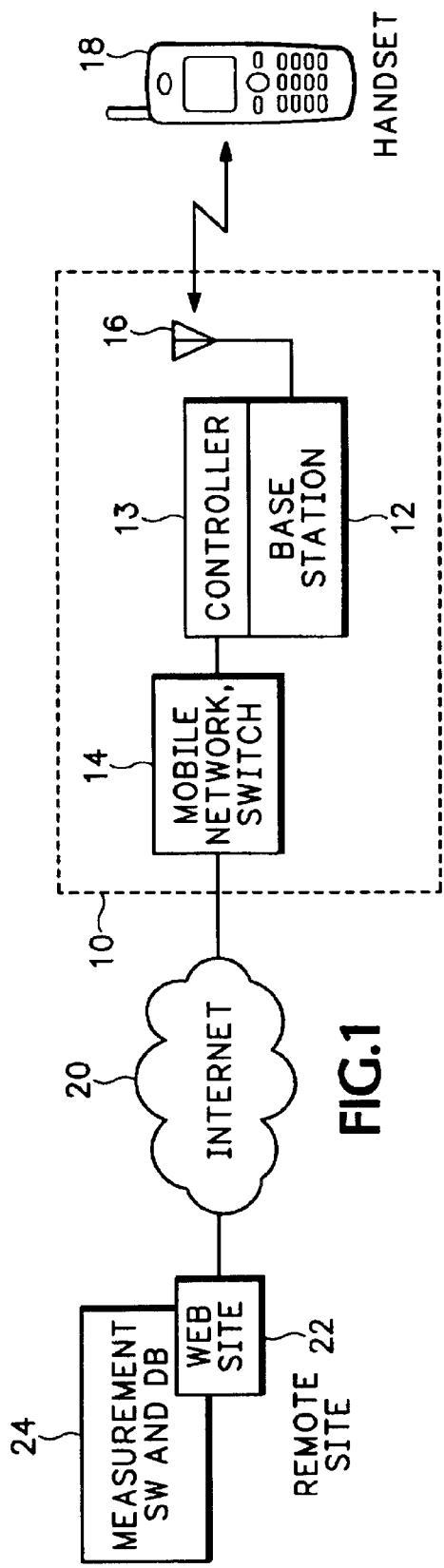
FIG. 1 is a block diagram view of a system for measuring wireless link performance from a remote site according to the present invention.

Referring now to FIG. 1 a system is shown for measuring wireless network performance from a remote site 22. A base station 12 is coupled to a mobile network switch 14 via a controller 13 and to an antenna 16 as part of a wireless network 10. Information is transmitted/received via the antenna 16 to/from a mobile handset 18. Additionally the base station is coupled via the network switch 14 to a world wide network 20, such as the Internet, to which the remote site 22 is connected. The remote site 22 collects data for a measurement computer 24 that contains application software for performing predictive and diagnostic analysis of data from the mobile handset 18. The handset 18 performs standard measurements of physical layer performance for the wireless network and collects data about performance, events and status on all the higher levels as well in response to commands received from the measurement computer 24 over the world wide and wireless networks. The measurement computer 24 via the world wide network 20 and wireless network 10 interrogates the mobile handset 18 for the data collected by the handset. A user uses an appropriate browser or other software on the mobile handset 18 to establish a network connection with the remote site 22 using standard means such as Wireless Application Protocol (WAP). The application software on the measurement computer 24 sends commands and queries to the mobile handset 18 via the world wide and wireless networks 10, 20 and receives responses in return. The data collected through the remote site 22 is then processed by the measurement computer 24 to assess the quality of the overall wireless network and of the various links in the network.

Additional inferential measurements that are not built into the mobile handset 18 may be implemented through the application software at the remote site 22. For example, the application software 24 may send a message from the remote site 22 to the mobile handset 18 which the mobile handset then returns to the remote site. Time to receipt may be measured by the application software 24 and compared against previous measurements. Another variation is to collect location data from the mobile handset 18, such as GPS latitude and longitude data, along with the measurement data to assess performance in a geographic context.

Figure 2:
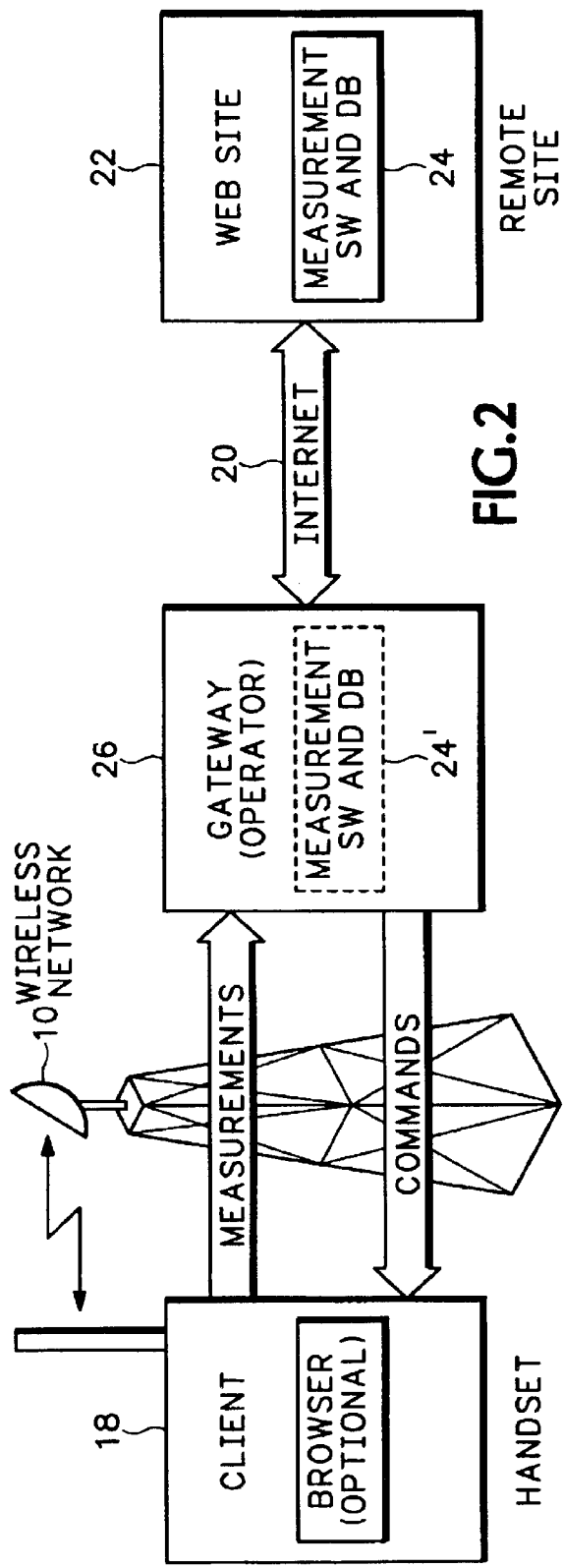
FIG. 2 is a block diagram view of another system for measuring wireless link performance from a remote site according to the present invention.

A related application allows the application software 24 to collect the mobile handset measurement, event and status data without the handset's user actually connecting to the remote site 22. For instance as shown in FIG. 2 a web-enabled handset 18 from a wireless service provider, such as Sprint PCS, connects to the world wide network via that wireless service provider's gateway 26. Data may be collected from the mobile handset 18 by software residing on the wireless service provider's gateway 26 and then relayed to the application software 24 at the remote site 22 over the world wide network 20, or even processed by application software 24' at the gateway 26. This allows data collection from many mobile handsets 18 in any location at all times without requiring operator involvement. Typical measurement data include PN Offset and Receive Power Level plus latitude, longitude and handset identification (telephone number). These measurements may be saved and processed by the application software 24 together with hundreds of other data sets from other handsets 18 to yield a geographic map of parameters, such as received power for the multiple base stations operating in an area.

The above described methodology works with any network equipment and uses a standard mobile handset 18 or a software-modified handset to accomplish the task, drastically reducing both development costs and product hardware costs. The user does not have to carry or operate a computer for controlling the handsets, as this control is performed on the other end of the world wide network connection. Measurement data may be collected from many handsets, many locations and many base stations at many times. Further the mobile handset's performance may be tracked through the network, given storage of the handset's ID and location (either latitude/longitude or cell), i.e., "does this mobile handset have problems in certain locations or at certain power levels?" Additionally the collected results are automatically stored in a central location and do not need to be transferred from the user's computer to a central processing location. An additional benefit is that a user profile, if any, is implemented with web pages sent to the mobile handset screen rather than using the handset's own limited resources. Finally the results or partial information from the application software may be reported back to the mobile handset display screen so the user in the field has some basic knowledge of the wireless network performance.

Thus the present invention provides for measuring wireless network performance from a remote site by coupling a mobile handset over a world wide network, such as the Internet, to the remote site on a measurement computer having application software where the measurement computer queries the mobile handset and receives data concerning the wireless network performance which may be analyzed for predictive and diagnostic purposes.

What is claimed is:

1. A system for measuring the performance of a wireless network from a remote site comprising:
   a mobile handset that communicates with the wireless network;
   a world wide network coupled between the wireless network and the remote site; and
   a measurement computer at the remote site having application software that automatically communicates with the mobile handset by sending commands for execution by the mobile handset and in response receiving measurement data from the mobile handset once connection is established over the world wide and wireless networks between the measurement site and the mobile handset, the application software providing measures of performance for the wireless network from the measurement data.

2. The system as recited in claim 1 wherein the application software further provides the measures of performance for the wireless network to the mobile handset over the world wide and wireless networks.

3. The system as recited in claim 1 wherein the measurement data comprises data selected from the group consisting of PN offset, received power level, geographic location and identification of the mobile handset.

4. The system as recited in claim 1 wherein the mobile handset further has a geographic location finder so that the measurement data includes geographic location and the measures of performance are related the geographic location.

5. The system as recited in claim 1 further comprising a gateway coupled between the wireless network and the world wide network, the gateway being coupled by the world wide network to the remote site and having application software for generating the commands to the mobile handset, receiving responses from the mobile handset and forwarding the measurement data to the remote site for processing by the remote site application software without connecting the mobile handset to the remote site.

* * * * *